Oct. 17, 1961   H. V. STRUCKHOFF   3,004,518
STOCK FEEDER
Filed Jan. 13, 1960
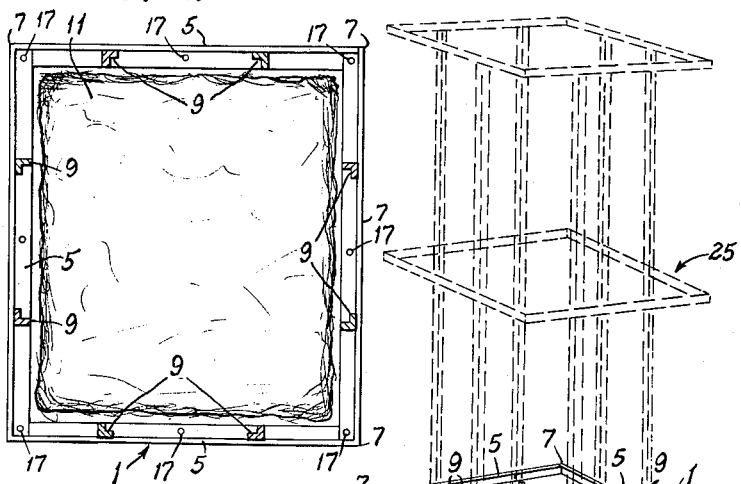
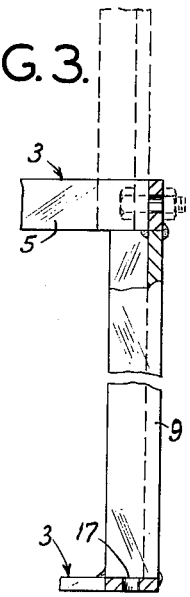
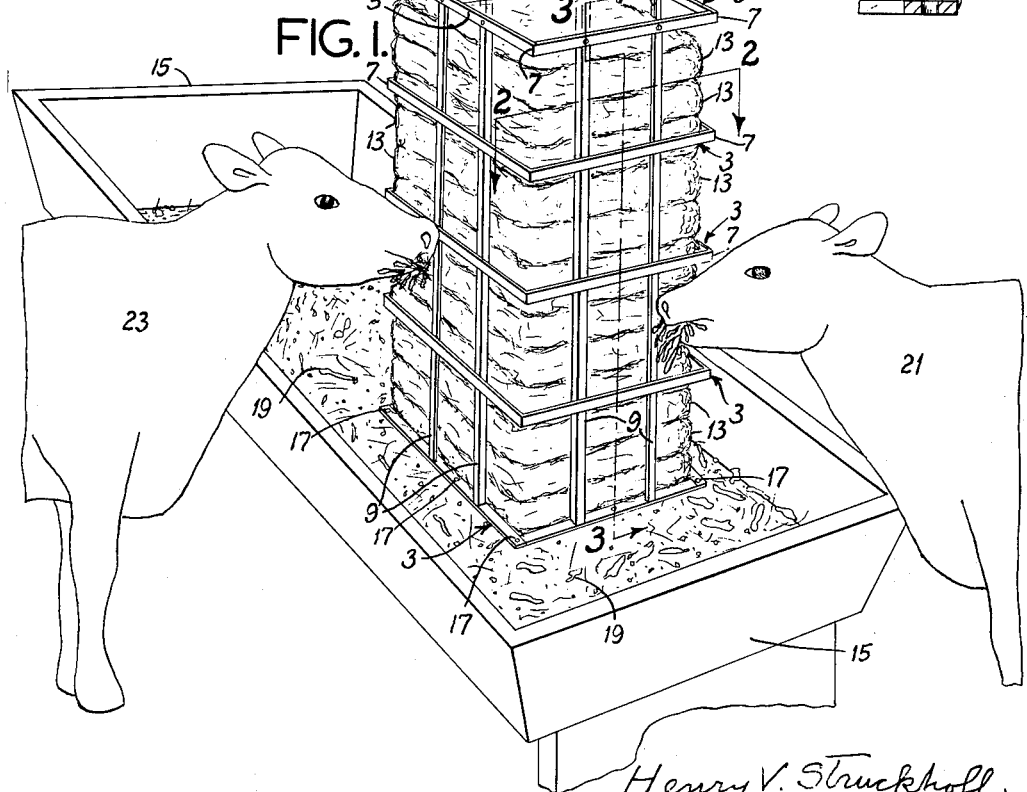
Henry V. Struckhoff,
Inventor.
Koenig and Pope,
Attorneys.

3,004,518
STOCK FEEDER
Henry V. Struckhoff, R.R. 1, Box 46, Augusta, Mo.
Filed Jan. 13, 1960, Ser. No. 2,235
1 Claim. (Cl. 119—58)

This invention relates to stock feeders, and with regard to certain more specific features, to such feeders for so-called square-baled hay and the like.

Among the several objects of the invention may be noted the provision of a stock feeder for hay and the like, preferably in rectangularly baled form, adapted to present the feed for easy access to the stock; the provision of a feeder of the class described which reduces feed losses by preventing the stock from tossing substantial amounts underfoot; and the provision of a feeder of the class described which accomplishes more equitable distribution to feeding groups. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which one of various possible embodiments of the invention is illustrated, FIG. 1 is a perspective view showing mounting of the feeder in a feed bunk, the dotted lines indicating an auxiliary chute that may be used;

FIG. 2 is an enlarged cross section taken on line 2—2 of FIG. 1; and,

FIG. 3 is a further enlarged cross section taken on line 3—3 of FIG. 1, parts being broken away.

Corresponding reference characters indicate corresponding parts throughout the several views of the drawings.

The present invention is designed primarily for the feeding of rectangularly (so-called square) baled hay, in regard to which it has its primary advantages, although if desired it may be used to feed loose hay. Square baled hay is often fed to stock by placing it in one way or another in a feed bunker or the like, or even on the ground, and permitting the stock to gain uncontrolled access thereto. Under such conditions it is difficult to maintain it in an up-ended position. Such bales, unlike some round bales in which the hay is wound up in a scroll, have the hay arranged in so-called compressed plugs. The tendency of the stock is first to pull at and feed from the corners of such a rectangular bale, with the result that if upright it will be pushed over into a horizontal position. Moreover, large plug segments are withdrawn and tossed about, to be lost underfoot. As much as 30–50% or so of waste may thus occur. Out of a group of livestock, one or more of the aggressive members under such circumstances will gain access to more feed and prevent its even distribution among the feeding herd. My invention reduces the waste and provides a more equitable distribution of the hay feed.

Referring now more particularly to the drawings, the invention will be seen to consist of a preferably metal rack shown generally at 1, composed of spaced rectangular frames 3 having sides 5 and corners 7. The frames 3 are supported horizontally in spaced relationship by pairs of upright supports 9. Attachments may be made by welding, bolting, riveting or the like. The attachments of each pair of uprights 9 to the respective sides 5 occur at a substantial distance from the adjacent corners 7, so that the corners in effect produce pointed overhangs or cornices. The spacing between the cornices 7 is arranged to be just greater than the approximate depth of the heads of the feeding animals.

The vertical position of the assembly of frame parts 3 and uprights 9 admits a bale of hay 11 in an upright position, which is the best for convenient access to the stock. The fit between the sides of the bale 11 and the insides of the assembly should be loose enough to allow a bale conveniently to telescope downward into the position shown in FIG. 1 when inserted into the top of the feeder.

As will be noted from FIG. 1, the bale has the above-mentioned plugs 13 due to the manner in which the bale was originally made up in the field. Thus a bale such as 11 may be slipped on end into the feeder, as indicated in FIG. 1, the plugs 13 being presented flatwise at its corner between the cornices 7.

As initially inserted in the feeder, the bale may include its usual wire or twine tires. These may be cut and removed either before or after insertion. The feeder may be mounted in any desirable location. In FIG. 1 it is shown as being located on the bed of a feed bunk 15, being bolted or otherwise fastened thereto as indicated at 17. The bunk may be used for its usual purpose of containing grain, silage and the like around the mounted hay feeder, as indicated at 19.

In FIG. 1, numeral 21 indicates an animal gaining access to an exposed corner portion of the plugs 13 of the bale. It is apparent that this access is between the fairly sharp cornices 7. Thus, without the usual tossing, the animal is limited to withdrawing only a mouthful of hay instead of, as usual, pulling out a large portion of a plug and tossing it on the ground to be lost. It will be observed that if the animal 21 were to attempt to toss its head while in the feed-withdrawing position shown, it would encounter sharp cornice points, which discourage such activity. Four relatively free access corners are thus presented. Additional access openings are presented between the crossings of each adjacent pair of frames 3 and uprights 9. The animal 23 at the left of FIG. 1 is illustrated as feeding from one of these. Thus while the more aggressive animals may feed from the more desirable corners, the others can feed at the intermediate locations.

As hay is withdrawn from the feeder, its level descends and in time an additional bale may be telescoped vertically therein. For introducing the same it may be desirable to employ a chute, such as illustrated by the dotted lines 25. For example, it may be used for guiding the bales from an overhead supply, as from a loft. While the preferred form of the hay feed is in the rectangular bale form above described, it will be understood that loose hay may also be supplied to the feeder and somewhat the same feeding advantages will accrue.

It may be mentioned that I have found that round bales, which are in effect made up of a spiral mat of hay, cannot be as satisfactorily presented to animals in baled form because it is difficult for them to attack the relatively hard surface of the mat.

While flat bar stock is preferable for the frames 3 and angles irons for the uprights 9 (as shown in FIG. 3), it will be understood that other metal forms may be used or even wood strips. However, metallic construction is preferred for strength.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

A stock feeder for rectangular hay bales to be vertically positioned, comprising uprights, corner-forming horizontal rectangular frames supported by said uprights in vertical spaced relationship, the resulting assembly having one pair of uprights on each side, the pairs of uprights on adjacent sides with the frames forming rectangular access openings spaced substantially away from the corners of said frames, said corners forming cornices, the vertical spacing between frames being such as only conveniently to admit the jaws of a feeding animal between cornices and in the rectangular access openings.

References Cited in the file of this patent

UNITED STATES PATENTS

| | | |
|---|---|---|
| 390,259 | Schwartz | Oct. 2, 1888 |
| 1,786,777 | Pfeiffer | Dec. 30, 1930 |